UNITED STATES PATENT OFFICE.

CARL BÜLOW, OF TUBINGEN, GERMANY, ASSIGNOR TO THE BADISCHE ANILIN AND SODA FABRIK, OF LUDWIGSHAFEN, GERMANY.

BLACK DISAZO DYE.

SPECIFICATION forming part of Letters Patent No. 590,088, dated September 14, 1897.

Application filed May 24, 1897. Serial No. 637,913. (Specimens.) Patented in England May 4, 1891, No. 7,713; in France May 4, 1891, No. 213,232, and in Germany July 24, 1891, No. 91,855.

*To all whom it may concern:*

Be it known that I, CARL BÜLOW, doctor of philosophy, a subject of the Grand Duke of Mecklenburg-Schwerin, residing at Tubingen, in the Kingdom of Würtemberg and Empire of Germany, have invented new and useful Improvements in the Manufacture of Black Disazo Dyes, (for which patents have been obtained in Germany, No. 91,855, dated July 24, 1891; in France, No. 213,232, dated May 4, 1891, and Certificats d'Addition, dated August 26 and 27, 1891, and in England, No. 7,713, dated May 4, 1891,) of which the following is a specification.

My invention relates to a new series of black disazo dyestuffs suited for dyeing wool or other animal fiber and derived from an oxynaphthylamin-sulfonic acid which is isomeric with the amidonaphthol-sulfonic acid from which the dyes described in the United States Letters Patent No. 524,665, dated August 14, 1894, granted to me are derived.

Although the dyes of this application for Letters Patent belong to the same class or type as the dyes of the above-named United States patent and also possess in common with these patented dyes the generic property of being destroyed in alkaline solution by a diazo body, such as diazo-benzene-sulfonic acid, still they differ from the dyes of the aforesaid patent granted to me in the following generical respects:

First. Their chemical constitution is different, since they are derived from the 1.8 amidonaphthol 4 sulfonic acid—that is, oxynaphthylamin-sulfo-acid—while the patented dyes are derived from the 1.8 amidonaphthol 5 sulfonic acid.

Second. The water solutions of their neutral sodium salts are more reddish than solutions of the corresponding patented dyes.

Third. Their solutions in concentrated sulfuric acid are less greenish or yellowish—that is, more violet or bluish—than solutions of the corresponding dyes of the patent.

Fourth. The dyestuffs of this application dye in shades which are more reddish than those obtained with the corresponding dyes of the patent.

In the present application for Letters Patent I propose to claim generically the new class of dyes which can be obtained from the oxynaphthylamin-sulfo-acid ($NH_2.OH.SO_3H$ =1.8.4) and either two molecular proportions of one and the same diazo compound or one molecular proportion each of two different diazo compounds and are produced by combining either entirely in alkaline solution or the one in acid solution and the other in alkaline solution, and in this case the order of introducing the diazo compounds may be the one or the other for any pair of diazo bodies. In some cases also both stages of the combination may be effected in acid solution.

Specifically I claim the dye obtained by combining one molecular proportion of the aforesaid oxynaphthylamin-sulfo-acid with one molecular proportion of diazotised sulfanilic acid in acid solution and then combining this monoazo body in alkaline solution with one molecular proportion of diazotised alpha-naphthylamin. The second combination can be effected also in acid solution without altering the nature of the product. The same product can be obtained by combining the oxynaphthylamin-sulfo-acid first with the diazo-naphthalene in alkaline solution and then combining this monoazo compound with diazo-benzene-sulfonic acid in either acid or alkaline solution. A similar product isomeric with the above is obtained if the diazo-naphthalene be combined in acid solution first and the diazo-benzene-sulfonic acid be combined in alkaline or acid solution second, and this same product is obtained if the first combination be effected with diazo-benzene-sulfo-acid in alkaline solution and the second with diazo-naphthalene in either alkaline or acid solution, but this product is not claimed specifically. Similarly also on working in the same way with any other pair of the diazo compounds corresponding isomeric bodies are obtained.

I prefer as a rule to effect the first combination in acid solution and the second in alkaline solution.

The following example will serve to illustrate the manner in which my invention can best be carried into practical effect and the new dyestuff obtained. The parts are by weight.

Example: Stir the thin paste of paradiazobenzene-sulfonic acid obtained in the well-known manner from nineteen and a half (19.5) parts of anhydrous sodium sulfanilate, seven (7) parts of sodium nitrite, (98.5 per cent.,) three hundred and fifty (350) parts of water, and thirty (30) parts of thirty per cent. hydrochloric acid into six hundred (600) parts of a paste of oxynaphthylamin-sulfo-acid containing twenty-four (24) parts of the pure acid. Continue stirring until the monoazo compound has been formed. Then add thirty-six (36) parts of calcined sodium carbonate in fifteen-per-cent. solution. Gradually stir into this solution of the monoazo compound a solution of diazo-naphthalene obtained in the well-known manner from fourteen and three-tenths (14.3) parts of alpha-naphthylamin, forty (40) parts of thirty per cent. hydrochloric acid, seven (7) parts of 98.5 per cent. sodium nitrite, three hundred (300) parts of water, and three hundred (300) parts of ice. As soon as the diazo body has entirely disappeared warm the liquid up to 70° to 80° centigrade, precipitate the disazo dyestuff by salt solution, (free from lime,) filter, press, and dry. Any red by-products which may have been formed are left in the mother liquor.

Similar black disazo dyes may be obtained by substituting for the 14.3 parts of alpha-naphthylamin of the preceding example nine and three-tenths (9.3) parts of anilin, ten and seven-tenths (10.7) parts of ortho or para toluidin, and twelve and one-tenth (12.1) parts of xylidin.

In preparing my new black dyestuffs a large number of other diazo compounds may be used, but the best and hitherto most economical results have been obtained by using those diazo compounds mentioned and in the manner hereinbefore set forth. The dyes obtained by using two molecular proportions of the same or different unsulfonated diazo compounds are of course less soluble in water than those in which additional sulfo groups are present, but also constitute valuable dyes.

My new black dyestuffs as neutral salts possess the following generic properties: In appearance a dark powder with a bronze-like sheen. On treating a solution of the dyestuff made alkaline with sodium carbonate with a diazo compound, such as diazo-benzene sulfonic acid, the new black dyestuff is entirely destroyed. This is a property which must be taken into consideration in manufacturing, for the presence of an excess of diazo compound in alkaline solution causes a loss or destruction of the desired product. It is soluble in sulfuric acid and the color of the solutions obtained with pure concentrated sulfuric acid when seen in thin layers are reddish blue to bluish green, being of more violet or bluish color than the corresponding solution of the black disazo dyes patented to me in Patent No. 524,665.

The specific dyestuff obtained by the use of, first, the diazo compound from sulfanilic acid in acid solution, and, secondly, the diazo compound from alpha-naphthylamin in alkaline solution is characterized by the following properties: It possesses all the generic properties described, being destroyed by a diazo body in alkaline solution and yielding a reddish-blue solution in pure concentrated sulfuric acid which is more violet than the shade of the sulfuric-acid solution of the corresponding dye of Patent No. 524,665, granted to me and which on pouring into water yields a blue flocculent precipitate. If this specific coloring-matter be reduced with zinc-dust in a solution rendered strongly alkaline with caustic soda and the resulting solution distilled with steam, alpha-naphthylamin passes over with the distillate.

Now what I claim is—

1. The new black disazo dyes derived from the oxynaphthylamin-sulfo-acid ($NH_2.OH.SO_3H - 1.8.4$) by combining one molecular proportion of this acid with two molecular proportions of diazo compound as hereinbefore explained, and which are destroyed by treatment with diazo-benzene-sulfo-acid in alkaline solution, and are soluble in pure sulfuric acid giving reddish-blue to bluish-green solutions, all substantially as described.

2. The specific black disazo dyestuff derived from the aforesaid oxynaphthylamin-sulfo-acid by combining one molecular proportion of this acid with one molecular proportion of diazo-benzene-sulfonic acid and with one molecular proportion of the diazo compound of alpha-naphthylamin and which is destroyed by diazo-benzene-sulfo-acid in alkaline solution, and which yields a reddish-blue solution in pure concentrated sulfuric acid which solution, on pouring into water, yields a blue flocculent precipitate and yields, on reduction in strong caustic alkaline solution, alpha-naphthylamin, which passes into the distillate on distilling with steam, all substantially as described.

In testimony whereof I have hereunto set hand in the presence of two subscribing witnesses.

CARL BÜLOW.

Witnesses:
CHRISTIAN BAUER,
WM. HAHN.